Feb. 12, 1929.  R. RODERWALD  1,701,507

PROCESS FOR MANUFACTURING V-TYPE BELTS

Filed Dec. 22, 1926

Inventor:
Rudolf Roderwald
by C. P. Goepel
his Attorney.

Patented Feb. 12, 1929.

1,701,507

UNITED STATES PATENT OFFICE.

RUDOLF RODERWALD, OF BERLIN, GERMANY.

PROCESS FOR MANUFACTURING V-TYPE BELTS.

Application filed December 22, 1926, Serial No. 156,529, and in Germany October 22, 1926.

Such belts are preferably made of rubber, strengthened with layers of canvas and comprise a continuous rubber impregnated strip of canvas adapted to sustain the stress or tension to be transmitted by the belt and provided with projections thereon adapted to increase the friction of the surface. Such a belt is for example disclosed in my patent application Ser. No. 39,005, filed June 23, 1925.

Heretofore such belts were manufactured in such a way, that such projections were fixed to the belt by vulcanization.

In consequence thereof these projections had not sufficient hold on the belt and were torn away from the strip in use.

Further the cost of such belts was considerable; the more so as their life was short.

It is an object of my present invention to manufacture a belt of the above said type in such a manner, that the danger of the projections working loose and being pulled off is obviated and it is a further object to obtain this result at small expense.

According to my invention I propose to make the belt first as a so called full V-type belt; i. e. as a belt without projections, and to form the latter by removing parts of the material of the belt at separated points.

I prefer to remove these parts by stamping; but they may be removed by cutting or boring without exceeding the scope of the invention.

It is clear, that the projections of a belt so produced are an integral part of the belt, so that there is no or a very reduced danger of the friction-blocks being pulled off.

Consequently the liability of the projections to being pulled off is practically eliminated and the life of such belts increased in a considerable extent.

In practicing my invention the belt may be a vulcanized belt, which then must be vulcanized again, when parts of the material have been removed.

I prefer however to form the belt first without vulcanizing then remove parts of the belt so that the projections are provided and finally to vulcanize the belt; so that a single vulcanization will be sufficient.

For vulcanizing a rubber impregnated cotton-canvas-band is to be wound around the belt. This band holds the parts of the belt together, increases the friction-coefficient and assists in holding the projections on the strip.

A further difficulty is however to overcome, when a belt not yet vulcanized is cut out or stamped out, and afterwards vulcanized. This difficulty arises because of the fact that the belt becomes especially lengthened by the stamping operation, with the result that the gaps or spaces between said projections no longer correspond with blocks which are fixed in the mould in which the belt is to be vulcanized.

In order to obviate this difficulty I propose to employ a mould with a smooth bottom and to insert loosely into the spaces between the projections of the belt bodies of metal or other suitable material which fill the said spaces and then to place the belt with these bodies into the mould.

In this manner the necessity for the extra vulcanization is avoided.

As above stated, projections may be formed by removing the material from either an unvulcanized belt or a vulcanized one, and said projections may be provided on either the narrow inner side of the belt or the wide outer side, or on both sides.

The nature of the invention is shown in the accompanying drawing but changes may of course be made in the shape, size and arrangement of the various parts to the full extent indicated by the broad and general meaning of the terms in which the appended claims are expressed.

On the drawings.

On the drawings the same numerals identify the same parts throughout.

The body of the belt is shown at $a$ with a relatively wide outer face and a relatively narrow inner face united by inclined sides which converge toward the inner face or side of the belt after the belt has been formed. I remove parts of the belt from the inner relatively narrow face to make recesses $b$ that alternate with projections $c$. The belt can then be enclosed in a band of fabric shown at $f$ and put in the mold $g$, which contains blocks $h$ which fill the recesses $b$. Then the process of vulcanizing is performed.

Figures 1, 2:
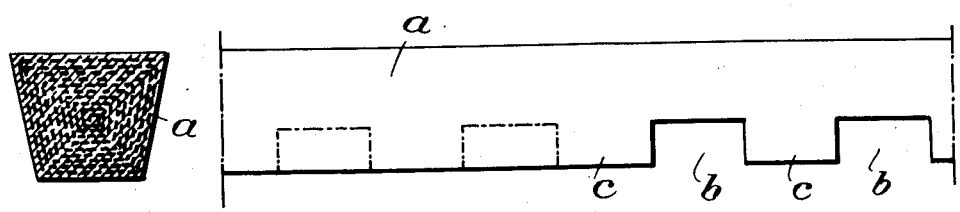
Figure 1 is a cross-section showing the shape of the belt according to this invention.
Figure 2 is a side view showing the narrower side of the belt with projections separated by recesses made by removing parts.
Figure 3:
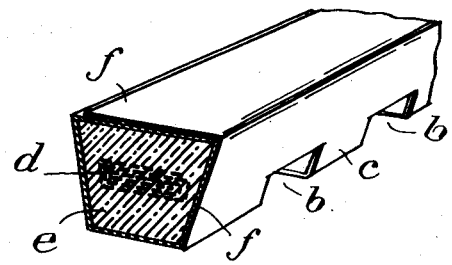
Figure 3 is a perspective view of a section of the belt.
Figure 4:
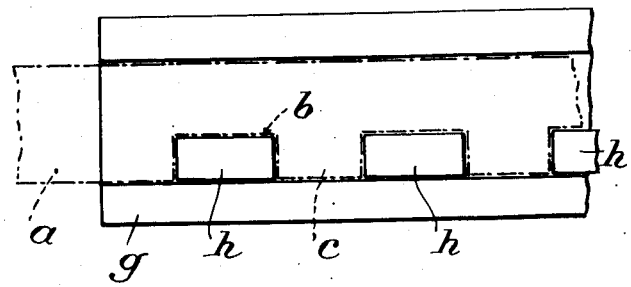
Figure 4 shows the belt in the mold where the vulcanization is accomplished.

The body of the belt may be made either entirely of rubber or of fabric impregnated with rubber, as indicated at $a$ in Figure 1, rolled to give the required shape. The belt may also be made as indicated in Figure 2 with a rubber body $e$ having a reinforced fabric $d$ embedded therein.

What I claim, is:

1. The process of manufacturing V-belts which consists in forming the belt throughout its length as a full V-belt, then removing parts of the belt at separated points to provide projections and finally vulcanizing the belt.

2. The process according to claim 1 in which the parts of the belt are removed by stamping to form the projections.

3. The process of manufacturing V-belts which consists in forming the belt throughout its length, first as a full V-belt, then removing parts of the belt at separated points to form projections thereon, filling the spaces between the projections with suitable bodies and finally vulcanizing the belt with said bodies in position.

4. The process for manufacturing V-belts which consists in first forming the belt throughout its total length as a full V-belt, surrounding the belt with a rubber impregnated band of fabric, then removing parts of said belt at separate points to provide projections and finally vulcanizing the belt.

In testimony that I claim the foregoing as my invention, I have signed my name.

RUDOLF RODERWALD.